(12) United States Patent
Wei et al.

(10) Patent No.: US 11,112,902 B2
(45) Date of Patent: Sep. 7, 2021

(54) TOUCH OPERATION PROCESSING METHOD AND TERMINAL DEVICE

(71) Applicant: Huawei Device Co., Ltd., Guangdong (CN)

(72) Inventors: Huan Wei, Shenzhen (CN); Xuenan Zhang, Shenzhen (CN)

(73) Assignee: HUAWEI DEVICE CO., LTD., Dongguan (CN)

( * ) Notice: Subject to any disclaimer, the term of this patent is extended or adjusted under 35 U.S.C. 154(b) by 0 days.

(21) Appl. No.: 16/944,834

(22) Filed: Jul. 31, 2020

(65) Prior Publication Data

US 2021/0011598 A1 Jan. 14, 2021

Related U.S. Application Data

(63) Continuation of application No. 16/374,233, filed on Apr. 3, 2019, now Pat. No. 10,754,539, which is a
(Continued)

(51) Int. Cl.
| | |
|---|---|
| *G06F 3/0488* | (2013.01) |
| *G06F 3/041* | (2006.01) |
| *G06F 3/0484* | (2013.01) |
| *G06F 3/01* | (2006.01) |
| *G06F 3/0481* | (2013.01) |

(Continued)

(52) U.S. Cl.
CPC ............ *G06F 3/0416* (2013.01); *G06F 3/017* (2013.01); *G06F 3/0488* (2013.01); *G06F 3/04817* (2013.01); *G06F 3/04842* (2013.01); *G06F 3/04886* (2013.01); *G06T 3/40* (2013.01); *G06F 1/1692* (2013.01); *G06F 3/041* (2013.01); *G06F 3/0428* (2013.01); *G06F 2203/04806* (2013.01)

(58) Field of Classification Search
CPC .... G06F 3/0488; G06F 3/017; G06F 3/04842; G06F 3/041; G06F 3/0416; G06F 2203/04806
See application file for complete search history.

(56) References Cited

U.S. PATENT DOCUMENTS

| | | |
|---|---|---|
| 5,406,307 A | 4/1995 | Hirayama et al. |
| 8,726,198 B2 | 5/2014 | Rydenhag et al. |

(Continued)

FOREIGN PATENT DOCUMENTS

| | | |
|---|---|---|
| CN | 102364428 A | 2/2010 |
| CN | 101763194 A | 6/2010 |

(Continued)

OTHER PUBLICATIONS

"Windows Phone 7.5," https://baike.baidu.com/item/Windows%20Phone%207.5?fromId=6010597, published on Sep. 27, 2011, 20 pages.

*Primary Examiner* — Shen Shiau
(74) *Attorney, Agent, or Firm* — Conley Rose, P.C.

(57) ABSTRACT

A touch operation processing method includes detecting a touch operation of a user, which starts from a border of a screen display area to the screen display area, and using the first point touched by the touch operation in the screen display area as a starting point; and performing, according to the touch operation, reduction processing on an operation interface displayed in the screen display area, where one edge of an operation interface after the reduction processing includes the starting point.

15 Claims, 7 Drawing Sheets

Related U.S. Application Data continuation of application No. 14/996,004, filed on Jan. 14, 2016, now Pat. No. 10,296,204, which is a continuation of application No. 14/104,912, filed on Dec. 12, 2013, now Pat. No. 9,268,482, which is a continuation of application No. PCT/CN2012/081495, filed on Sep. 17, 2012.

(51) Int. Cl.
*G06T 3/40* (2006.01)
*G06F 3/042* (2006.01)
*G06F 1/16* (2006.01)

(56) References Cited

U.S. PATENT DOCUMENTS

| | | | |
|---|---|---|---|
| 8,760,557 B2 | 6/2014 | Rydenhag et al. | |
| 8,769,431 B1* | 7/2014 | Prasad | G06F 3/048 715/788 |
| 8,869,059 B2* | 10/2014 | Aono | G06F 3/04886 715/773 |
| 9,268,482 B2* | 2/2016 | Wei | G06F 3/04886 |
| 9,360,952 B2* | 6/2016 | Lee | G06F 3/0482 |
| 9,529,490 B2* | 12/2016 | Li | G06F 3/04845 |
| 9,535,597 B2* | 1/2017 | Wong | G06F 3/04886 |
| 9,690,445 B2* | 6/2017 | Rice | G06F 3/0481 |
| 10,042,534 B2* | 8/2018 | Lee | G06F 3/04845 |
| 10,296,204 B2* | 5/2019 | Wei | G06F 3/04886 |
| 10,754,539 B2* | 8/2020 | Wei | G06F 3/04842 |
| 2002/0167529 A1 | 11/2002 | Kung | |
| 2009/0024956 A1 | 1/2009 | Kobayashi | |
| 2009/0278816 A1 | 11/2009 | Colson | |
| 2010/0020031 A1 | 1/2010 | Hwang et al. | |
| 2010/0039400 A1 | 2/2010 | Jang | |
| 2010/0060597 A1 | 3/2010 | Choi et al. | |
| 2010/0111429 A1 | 5/2010 | Wang et al. | |
| 2010/0127994 A1* | 5/2010 | Aono | G06F 3/04886 345/173 |
| 2010/0241985 A1 | 9/2010 | Kim et al. | |
| 2010/0302281 A1 | 12/2010 | Kim et al. | |
| 2010/0315438 A1 | 12/2010 | Horodezky et al. | |
| 2011/0141145 A1 | 6/2011 | Liang et al. | |
| 2011/0169749 A1* | 7/2011 | Ganey | G06F 3/04886 345/173 |
| 2011/0205163 A1 | 8/2011 | Hinckley et al. | |
| 2011/0209088 A1 | 8/2011 | Hinckley et al. | |
| 2011/0242138 A1 | 10/2011 | Tribble | |
| 2011/0246947 A1 | 10/2011 | Hirohata et al. | |
| 2012/0047463 A1 | 2/2012 | Park et al. | |
| 2012/0072847 A1 | 2/2012 | Lee et al. | |
| 2012/0086652 A1 | 4/2012 | Kim et al. | |
| 2012/0092381 A1 | 4/2012 | Hoover et al. | |
| 2012/0169774 A1 | 7/2012 | Yu | |
| 2012/0206363 A1 | 8/2012 | Kyprianou et al. | |
| 2012/0236037 A1 | 9/2012 | Lessing et al. | |
| 2012/0306788 A1 | 12/2012 | Chen et al. | |
| 2013/0002585 A1 | 1/2013 | Jee et al. | |
| 2013/0009903 A1 | 1/2013 | Shiota | |
| 2013/0042203 A1 | 2/2013 | Wong et al. | |
| 2013/0088445 A1 | 4/2013 | Kang | |
| 2013/0100061 A1 | 4/2013 | Kawauchi | |
| 2013/0111334 A1 | 5/2013 | Liang et al. | |
| 2013/0127750 A1 | 5/2013 | Horiuchi et al. | |
| 2013/0152024 A1 | 6/2013 | Liang et al. | |
| 2013/0237288 A1* | 9/2013 | Lee | G06F 3/03547 455/566 |
| 2013/0241827 A1 | 9/2013 | Ronkainen | |
| 2013/0275914 A1 | 10/2013 | Zhou | |
| 2013/0298076 A1* | 11/2013 | Rice | G06F 3/0481 715/781 |
| 2014/0062919 A1 | 3/2014 | Park | |
| 2014/0109022 A1* | 4/2014 | Wei | G06F 3/017 715/863 |
| 2014/0137036 A1* | 5/2014 | Han | G06F 3/0482 715/798 |
| 2014/0137042 A1 | 5/2014 | Du et al. | |
| 2014/0160073 A1* | 6/2014 | Matsuki | G06F 3/04886 345/174 |
| 2014/0164927 A1 | 6/2014 | Salaverry et al. | |
| 2014/0181739 A1* | 6/2014 | Yoo | G06F 3/14 715/800 |
| 2014/0289642 A1* | 9/2014 | Prasad | G06F 3/0482 715/745 |
| 2015/0046825 A1* | 2/2015 | Li | G06F 3/0481 715/728 |
| 2015/0082237 A1 | 3/2015 | Konishi et al. | |
| 2015/0084893 A1 | 3/2015 | Amagai | |
| 2015/0185987 A1 | 7/2015 | Tsai et al. | |
| 2015/0205396 A1 | 7/2015 | Konishi et al. | |
| 2015/0205507 A1 | 7/2015 | Chen | |
| 2016/0132208 A1* | 5/2016 | Wei | G06F 3/0488 715/863 |
| 2016/0253076 A1* | 9/2016 | Lee | G06F 3/041 455/566 |
| 2017/0139496 A1* | 5/2017 | Kang | G06F 3/04886 |
| 2018/0335939 A1* | 11/2018 | Karunamuni | G06F 8/38 |
| 2019/0227689 A1* | 7/2019 | Wei | G06F 3/0488 |

FOREIGN PATENT DOCUMENTS

| | | |
|---|---|---|
| CN | 101882055 A | 11/2010 |
| CN | 101901107 A | 12/2010 |
| CN | 101923438 A | 12/2010 |
| CN | 102122230 A | 7/2011 |
| CN | 102129312 A | 7/2011 |
| CN | 102360249 A | 2/2012 |
| CN | 102479041 A | 5/2012 |
| CN | 102520860 A | 6/2012 |
| CN | 102566908 A | 7/2012 |
| KR | 20100128453 A | 12/2010 |
| KR | 20120027516 A | 3/2012 |
| WO | 2005096134 A1 | 10/2005 |
| WO | 2010144726 A1 | 12/2010 |
| WO | 2011135944 A1 | 11/2011 |

* cited by examiner

TOUCH OPERATION PROCESSING METHOD AND TERMINAL DEVICE

CROSS-REFERENCE TO RELATED APPLICATIONS

This application is a continuation of U.S. patent application Ser. No. 16/374,233 filed on Apr. 3, 2019, which is a continuation of U.S. patent application Ser. No. 14/996,004 filed on Jan. 14, 2016, now U.S. Pat. No. 10,296,204, which is a continuation of U.S. patent application Ser. No. 14/104,912 filed on Dec. 12, 2013, now U.S. Pat. No. 9,268,482, which is a continuation of International Patent Application No. PCT/CN2012/081495 filed on Sep. 17, 2012. All of the aforementioned patent applications are hereby incorporated by reference in their entireties.

FILED OF THE DISCLOSURE

Embodiments of the present disclosure relate to communications technologies, and in particular, to a touch operation processing method and a terminal device.

BACKGROUND OF THE DISCLOSURE

With the rapid development of screen touch control technologies, a terminal device with a touch screen is widely applied. In addition, to improve user experience, a screen of a current terminal device, especially a mobile terminal, becomes increasingly large, so that a user can browse information through a large screen.

In some approaches, most users are accustomed to holding and operating this type of terminal device with a large screen with one hand. For example, the user may use one hand to hold the terminal device and use the thumb of this hand to tap a certain application client displayed in a screen display area, tap a video, or tap a web page link.

When a user holds and operates a terminal device with one hand, it is difficult for the user to perform an operation on an arbitrary position in the entire screen display area of the terminal device, and the user even cannot reach certain regions in the screen display area, thereby causing inconvenience to the operation of the user.

SUMMARY OF THE DISCLOSURE

Embodiments of the present disclosure provide a touch operation processing method and a terminal device.

A touch operation processing method provided by an embodiment of the present disclosure includes detecting a touch operation of a user, which starts from a border of a screen display area to the screen display area, and using the first point touched by the touch operation in the screen display area as a starting point; and performing, according to the touch operation, reduction processing on an operation interface displayed in the screen display area, where one edge of an operation interface after the reduction processing includes the starting point.

After performing, according to the touch operation, reduction processing on the operation interface displayed in the screen display area, the method also includes using content displayed at an end point position of the touch operation as selected content of the user.

Performing, according to the touch operation, reduction processing on the operation interface displayed in the screen display area includes performing, according to a track length of the touch operation, dynamic reduction processing on the operation interface displayed in the screen display area during the touch operation.

Performing, according to the touch operation, reduction processing on the operation interface displayed in the screen display area includes reducing the operation interface displayed in the screen display area to an operation interface of a fixed size according to the touch operation.

Performing reduction processing on the operation interface displayed in the screen display area includes performing reduction processing on the operation interface with the starting point as a fixed reference point if the starting point is in the range of a preset determination region, and if the starting point is not in the range of the preset determination region, performing reduction processing on the operation interface with an endpoint, which is an endpoint of the determination region and is close to the starting point, as the fixed reference point, where a part of the operation interface at a position of the fixed reference point maintains unchanged during the reduction processing.

Performing reduction processing on the operation interface displayed in the screen display area includes performing reduction processing on the operation interface with an endpoint of an edge, which is an edge of the screen display area on which the starting point lies, as a fixed reference point, where the endpoint and the starting point are located at the same side of a preset determination point on the edge, which is an edge of the screen display area on which the starting point lies, and a part of the operation interface at a position of the fixed reference point maintains unchanged during the reduction processing.

The method also includes restoring the operation interface after the reduction processing to the operation interface originally displayed in the screen display area.

Before detecting the touch operation of a user, which starts from a border of the screen display area to the screen display area, the method also includes receiving an input instruction of the user, and starting a border detecting function of the screen display area according to the input instruction.

A terminal device provided by an embodiment of the present disclosure includes: a detecting module configured to detect a touch operation of a user, which starts from a border of a screen display area to the screen display area, and use the first point touched by the touch operation in the screen display area as a starting point; and a processing module configured to perform, according to the touch operation, reduction processing on an operation interface displayed in the screen display area, where one edge of an operation interface after the reduction processing includes the starting point.

The terminal device also includes a selecting module configured to use content displayed at an end point position of the touch operation as selected content of the user.

The processing module is further configured to perform, according to a track length of the touch operation, dynamic reduction processing on the operation interface displayed in the screen display area during the touch operation.

The processing module is further configured to reduce the operation interface displayed in the screen display area to an operation interface of a fixed size according to the touch operation.

The processing module is further configured to, if the starting point is in the range of a preset determination region, perform reduction processing on the operation interface with the starting point as a fixed reference point, and if the starting point is not in the range of the preset determination region, perform reduction processing on the operation interface with an endpoint, which is an endpoint of the determination region and is close to the starting point, as the fixed reference point, where a part of the operation interface at a position of the fixed reference point maintains unchanged during the reduction processing.

The processing module is further configured to perform reduction processing on the operation interface with an endpoint of an edge, which is an edge of the screen display area on which the starting point lies, as a fixed reference point, where the endpoint and the starting point are located at the same side of a preset determination point on the edge, which is an edge of the screen display area on which the starting point lies, and a part of the operation interface at a position of the fixed reference point maintains unchanged during the reduction processing.

The terminal device also includes a restoring module configured to restore the operation interface after the reduction processing to the operation interface originally displayed in the screen display area.

The detecting module is further configured to receive an input instruction of the user and start a border detecting function of the screen display area according to the input instruction.

A terminal device provided by an embodiment of the present disclosure includes a touch screen configured to detect a touch operation of a user, which starts from a border of a screen display area to the screen display area, and use the first point touched by the touch operation in the screen display area as a starting point; and a processor configured to perform, according to the touch operation, reduction processing on an operation interface displayed in the screen display area, where one edge of an operation interface after the reduction processing includes the starting point.

The touch screen is further configured to use content displayed at an end point position of the touch operation as selected content of the user.

The processor is further configured to perform, according to a track length of the touch operation, dynamic reduction processing on the operation interface displayed in the screen display area during the touch operation.

The processor is further configured to reduce the operation interface displayed in the screen display area to an operation interface of a fixed size according to the touch operation.

The processor is further configured to, if the starting point is in the range of a preset determination region, perform reduction processing on the operation interface with the starting point as a fixed reference point, and if the starting point is not in the range of the preset determination region, perform reduction processing on the operation interface with an endpoint, which is an endpoint of the determination region and is close to the starting point, as the fixed reference point, where a part of the operation interface at a position of the fixed reference point remains unchanged during the reduction processing.

The processor is further configured to perform reduction processing on the operation interface with an endpoint of an edge, which is an edge of the screen display area on which the starting point lies, as a fixed reference point, where the endpoint and the starting point are located at the same side of a preset determination point on the edge, which is an edge of the screen display area on which the starting point lies, and a part of the operation interface at a position of the fixed reference point remains unchanged during the reduction processing.

The processor is further configured to restore the operation interface after the reduction processing to the operation interface originally displayed in the screen display area.

The touch screen is further configured to receive an input instruction of the user and start a border detecting function of the screen display area according to the input instruction.

In the touch operation processing method and the terminal device provided by the embodiments of the present disclosure, by the touch operation that starts from a border of the screen display area to the screen display area, reduction processing is performed on the operation interface of the terminal device, and the demand can be met that the user triggers, by one hand, reduction processing on the operation interface and performs a selection operation on an arbitrary position in the entire screen display area of the terminal device when the user holds the terminal device with a large screen with one hand and performs operations.

BRIEF DESCRIPTION OF THE DRAWINGS

To describe the technical solutions in the embodiments of the present disclosure, the following briefly introduces the accompanying drawings required for describing the embodiments. The accompanying drawings in the following description show some embodiments of the present disclosure, and persons of ordinary skill in the art may still derive other drawings from these accompanying drawings without creative efforts.

DETAILED DESCRIPTION OF THE EMBODIMENTS

To make the objectives, technical solutions, and advantages of the embodiments of the present disclosure more comprehensible, the following clearly describes the technical solutions in the embodiments of the present disclosure with reference to the accompanying drawings in the embodiments of the present disclosure. The embodiments to be described are merely a part rather than all of the embodiments of the present disclosure. All other embodiments obtained by persons of ordinary skill in the art based on the embodiments of the present disclosure without creative efforts shall fall within the protection scope of the present disclosure.

Figure 1A:
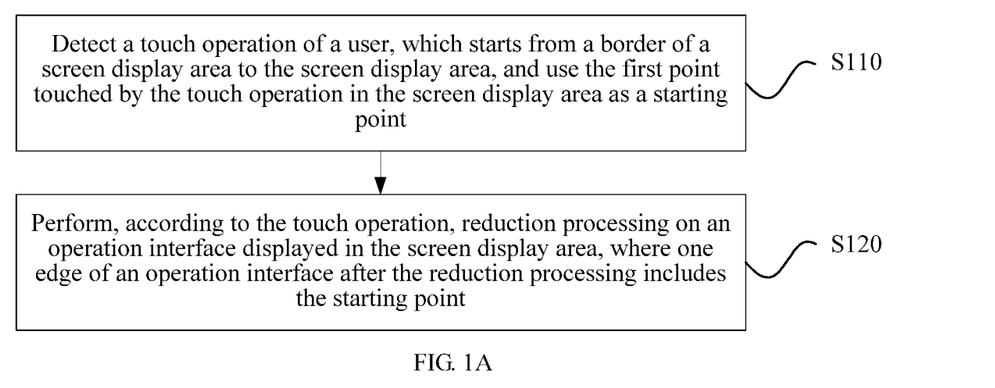
FIG. 1A is a flow chart of Embodiment 1 of a touch operation processing method provided by the present disclosure.

FIG. 1A is a flow chart of Embodiment 1 of a touch operation processing method provided by the present disclosure. As shown in FIG. 1A, the method in this embodiment may include the following steps.

Step S110: Detect a touch operation of a user, which starts from a border of a screen display area to the screen display area, and use the first point touched by the touch operation in the screen display area as a starting point.

A screen of a terminal device generally includes a display layer and a touch-sensitive layer that are superposed. The user obtains displayed content from the display layer and performs a touch operation on the terminal device through the touch-sensitive layer. The area of the touch-sensitive layer of the screen may be greater than that of the display layer of the screen. A display layer region of the screen of the terminal device is referred to as a screen display area, and a screen region other than the screen display area is referred as a border of the screen display area.

When a start position of the touch operation performed by the user on the terminal device is in the border of the screen display area of the terminal device and the touch operation slides into the screen display area of the terminal device from the border of the screen display area of the terminal device, the terminal device can detect and identify such a touch operation and define the first point touched by the touch operation in the screen display area as a starting point. The terminal device, for example, a mobile terminal device, may be a mobile phone, a tablet computer, or an E-book reader, which is not limited in the present disclosure.

Step S120: Perform, according to the touch operation, reduction processing on an operation interface displayed in the screen display area, where one edge of an operation interface after the reduction processing includes the starting point of the touch operation in the screen display area.

According to the touch operation detected in step S110, reduction processing is performed on the operation interface of an original size displayed in the screen display area. For example, according to factors such as the starting point or a sliding distance of the touch operation in the screen display area after the touch operation slides into the screen display area, reduction processing of different positions and proportions can be performed on the operation interface of an original size displayed in the screen display area, so as to obtain an operation interface having a smaller size and being suitable for an operation. The reduction processing may be equal proportion reduction or unequal proportion reduction, so as to obtain pictures of different proportions, such as a 16:9 picture or a 4:3 picture. The equal proportion reduction or the unequal proportion reduction is selected depending on a demand of the user, which is not limited in the embodiment of the present disclosure.

At least one edge of the operation interface after the reduction processing or an extension line of at least one edge of the operation interface after the reduction processing should include the starting point of the touch operation in the screen display area. That is, the operation interface after the reduction processing should closely contact the border from which the touch operation of the user starts, so that a finger of the same hand of the user, which initiates the touch operation, can reach an arbitrary position of the operation interface after the reduction processing.

In the touch operation processing method provided by this embodiment, the touch operation of the user, which starts from the border to the screen display area, is detected, and according to the touch operation, reduction processing is performed on the operation interface. The operation interface after the reduction processing is close to a position convenient for the user to perform a selection operation, and the demand can be met that the user triggers, by one hand, reduction processing on the operation interface and conveniently performs a selection operation on content at an arbitrary position in the entire screen display area of the terminal device when the user holds the terminal device with a large screen with one hand and performs an operation on it.

Figure 1B:
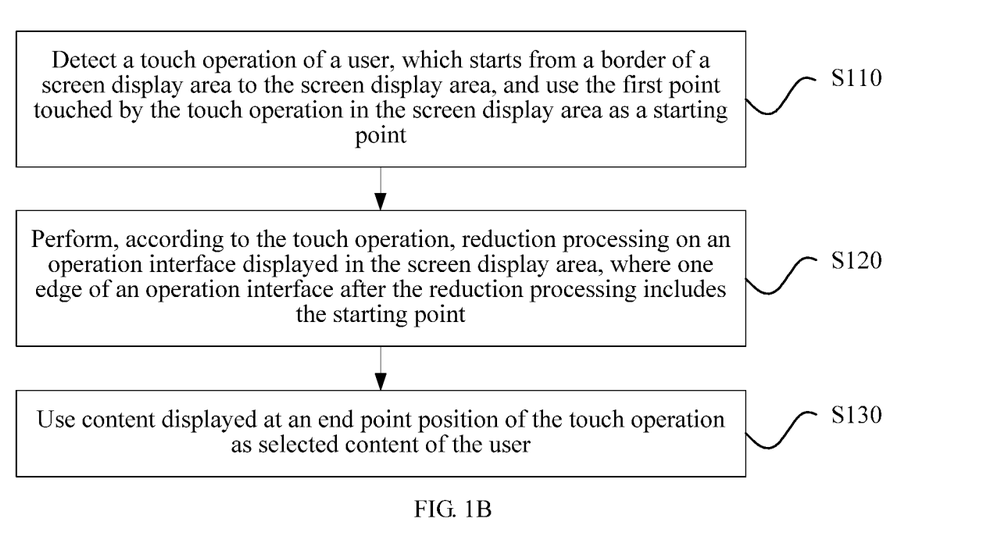
FIG. 1B is a flow chart of Embodiment 2 of a touch operation processing method provided by the present disclosure.

FIG. 1B is a flow chart of Embodiment 2 of a touch operation processing method provided by the present disclosure. As shown in FIG. 1B, the method in this embodiment may include the following steps.

Step S110: Detect a touch operation of a user, which starts from a border of a screen display area to the screen display area, and use the first point touched by the touch operation in the screen display area as a starting point.

A screen of a terminal device generally includes a display layer and a touch-sensitive layer that are superposed. The user obtains displayed content from the display layer and performs a touch operation on the terminal device through the touch-sensitive layer. The area of the touch-sensitive layer of the screen of the terminal device may be greater than that of the display layer. A display layer region of the screen of the terminal device is referred to as a screen display area, and a screen region other than the screen display area is referred to as a border of the screen display area.

When a start position of the touch operation performed by the user on the terminal device is in the border of the screen display area of the terminal device and the touch operation slides into the screen display area of the terminal device from the border of the screen display area of the terminal device, the terminal device can detect and identify such a touch operation and define the first point touched by the touch operation in the screen display area as a starting point. The terminal device, for example, a mobile terminal device, may be a mobile phone, a tablet computer, or an E-book reader, which is not limited in the present disclosure.

Step S120: Perform, according to the touch operation, reduction processing on an operation interface displayed in the screen display area, where one edge of an operation interface after the reduction processing includes the starting point of the touch operation in the screen display area.

According to the touch operation detected in step S110, reduction processing is performed on the operation interface of an original size displayed in the screen display area. For example, according to factors such as the starting point or a sliding distance of the touch operation in the screen display area after the touch operation slides into the screen display area, reduction processing of different positions and proportions can be performed on the operation interface of an original size displayed in the screen display area, so as to obtain an operation interface having a smaller size and being suitable for an operation. The reduction processing may be equal proportion reduction or unequal proportion reduction, so as to obtain pictures of different proportions, such as a 16:9 picture or a 4:3 picture. The equal proportion reduction or the unequal proportion reduction is selected depending on a demand of the user, which is not limited in the embodiment of the present disclosure.

At least one edge of the operation interface after the reduction processing, or an extension line of at least one edge of the operation interface after the reduction processing, should include the starting point of the touch operation in the screen display area. That is, the operation interface after the reduction processing should closely contact the border from which the touch operation of the user starts, so that a finger of the same hand of the user, which initiates the touch operation, can reach an arbitrary position of the operation interface after the reduction processing.

Step S130: Use content displayed at an end point position of the touch operation as selected content of the user.

The end point position at which the touch operation is finished is detected, and the content at the end point position, for example, an icon of a certain application, a hyperlink address, a play/pause button, page up and page down buttons, or an exit button, is used as the selected content of the user. Types of selection operations, such as tapping and double tapping, can be performed on the selected content, and a type of a specific selection operation may be set in advance.

In the touch operation processing method provided by this embodiment, the touch operation of the user, which starts from the border to the screen display area, is detected, and according to the touch operation, reduction processing is performed on the operation interface. The operation interface after the reduction processing is close to a position convenient for the user to perform a selection operation, and the content displayed at the end point position of the touch operation is used as the selected content of the user, so that the demand can be met that the user triggers, by one hand, reduction processing on the operation interface and performs a selection operation on content at an arbitrary position in the entire screen display area of the terminal device when the user holds the terminal device with a large screen with one hand and performs an operation on it.

Figure 2:
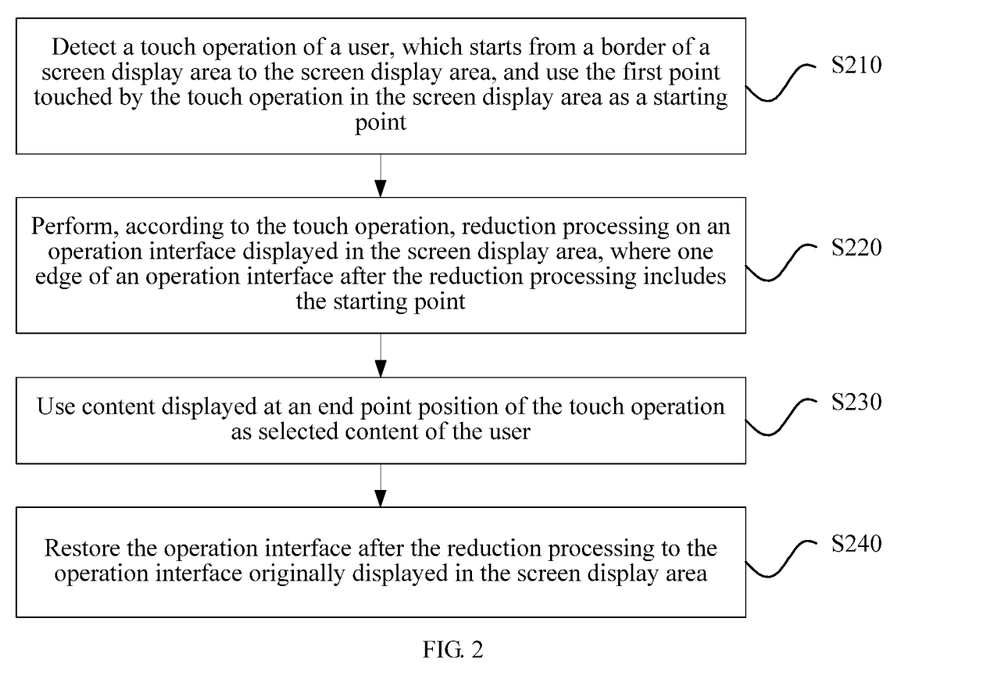
FIG. 2 is a flow chart of Embodiment 3 of a touch operation processing method provided by the present disclosure.

FIG. 2 is a flow chat of Embodiment 3 of a touch operation processing method provided by the present disclosure. As shown in FIG. 2, the difference between this embodiment and the embodiments in FIG. 1A and FIG. 1B lies in that after the content displayed at the end point position of the touch operation is used as the selected content of the user, a step of restoring the operation interface after the reduction processing to the operation interface originally displayed in the screen display area may further be included. The method in this embodiment may include the following steps.

Step S210: Detect a touch operation of a user, which starts from a border of a screen display area to the screen display area, and use the first point touched by the touch operation in the screen display area as a starting point.

A screen of a terminal device generally includes a display layer and a touch-sensitive layer that are superposed. The user obtains displayed content from the display layer and performs a touch operation on the terminal device through the touch-sensitive layer. The area of the touch-sensitive layer of the screen of the terminal device may be greater than that of the display layer. A display layer region of the screen of the terminal device is referred to as a screen display area, and a screen region other than the screen display area is referred to as a border of the screen display area.

When a start position of the touch operation performed by the user on the terminal device is in the border of the screen display area of the terminal device and the touch operation slides into the screen display area of the terminal device from the border of the screen display area of the terminal device, the terminal device can detect and identify such a touch operation. The terminal device, for example, a mobile terminal device, may be a mobile phone, a tablet computer, or an E-book reader.

Step S220: Perform, according to the touch operation, reduction processing on an operation interface displayed in the screen display area, where one edge of an operation interface after the reduction processing includes the starting point of the touch operation in the screen display area.

According to the touch operation detected in step S210, reduction processing is performed on the operation interface of an original size displayed in the screen display area. For example, according to factors such as the starting point or a sliding distance of the touch operation in the screen display area after the touch operation slides into the screen display area, reduction processing of different positions and proportions can be performed on the operation interface of an original size displayed in the screen display area, so as to obtain an operation interface having a smaller size and being suitable for an operation. The reduction processing may be equal proportion reduction or unequal proportion reduction, so as to obtain pictures of different proportions, such as a 16:9 picture or a 4:3 picture. The equal proportion reduction or the unequal proportion reduction is selected depending on a demand of the user, which is not limited in the embodiment of the present disclosure.

At least one edge of the operation interface after the reduction processing or an extension line of at least one edge of the operation interface after the reduction processing should include the starting point of the touch operation in the screen display area. That is, the operation interface after the reduction processing should closely contact the border from which the touch operation of the user starts, so that a finger of the same hand of the user, which initiates the touch operation, can reach an arbitrary position of the operation interface after the reduction processing.

Step S230: Use content displayed at an end point position of the touch operation as selected content of the user.

The end point position at which the touch operation is finished is detected, and the content at the end point position, for example, an icon of a certain application, a hyperlink address, a play/pause button, page up and page down buttons, or an exit button, is used as the selected content of the user. Types of selection operations, such as tapping and double tapping, can be performed on the selected content, and a type of a specific selection operation may be set in advance.

Step S240: Restore the operation interface after the reduction processing to the operation interface originally displayed in the screen display area.

After the finger of the user leaves the screen display area, that is, after a selection operation on the selected content is completed, the operation interface after the reduction processing can be automatically restored to the operation interface originally displayed in the screen display area. Of course, the operation interface after the reduction processing may also be restored to the operation interface originally displayed in the screen display area by using methods such as pressing a button of the terminal device or tapping the screen. The method of triggering step S240 is not limited in the embodiment of the present disclosure.

In the touch operation processing method provided by this embodiment, the touch operation of the user, which starts from the border to the screen display area, is detected, and according to the touch operation, reduction processing is performed on the operation interface. The operation interface after the reduction processing is close to a position convenient for the user to perform a selection operation, and the content displayed at the end point position of the touch operation is used as the selected content of the user. After the selection operation is completed, the size of the operation interface is restored. The demand can be met that the user triggers, by one hand, reduction processing on the operation interface, performs a selection operation on content at an arbitrary position in the entire screen display area of the terminal device, and after completing the selection operation, restores the operation interface when the user holds the terminal device with a large screen with one hand and performs an operation on it.

In the method embodiment shown in any one of FIG. 1A to FIG. 2, the performing, according to the touch operation, reduction processing on the operation interface displayed in the screen display area may include performing, according to a track length of the touch operation, dynamic reduction processing on the operation interface displayed in the screen display area during the touch operation. It is assumed that the correspondence between a track length L of a touch operation performed by the user on a 5.5-inch screen display area and a reduction size S is preset as follows: the operation interface displayed in the screen display area is reduced by 0.2 inch for each 1 millimeter that the track length L is increased by. Accordingly, when the track length L of the touch operation performed by the user on the screen display area is 1 centimeter, the 5.5-inch screen display area is reduced to a screen display area of a 3.5-inch size. Of course, the correspondence between the track length L and the reduction size S is not limited thereto, and can be flexibly adjusted according to factors such as the size of the screen display area of the terminal device. A size limit may also be specified for the size of the operation interface after reduction processing. For example, the size of the operation interface after reduction processing is not less than 2.5 inches, so as to avoid the situation that the operation interface is so small that the user cannot identify content to be operated or the user performs a misoperation; or reducing the operation interface displayed in the screen display area to an operation interface of a fixed size according to the touch operation. Once the touch operation of the user enters the screen display area of the terminal device, and when it is assumed that the size of the screen display area is 5.5 inches and a value of the track length L of the touch operation is greater than zero, the operation interface displayed in the screen display area is reduced to an operation interface of a preset fixed size. For example, the operation interface displayed in the screen display area is reduced to a preset 3.5-inch operation interface. Of course, the size of the preset operation interface after reduction processing is not limited thereto, and may be flexibly adjusted according to factors such as the size of the screen display area of the terminal device or a user preference.

In the touch operation processing method provided by this embodiment, the touch operation of the user, which starts from the border to the screen display area, is detected, and according to the track length of the touch operation, the operation interface is reduced to an operation interface of a corresponding size. The operation interface after the reduction processing is close to a position convenient for the user to perform a selection operation, and the content displayed at the end point position of the touch operation can be used as the selected content of the user for the selection operation. The demand can be met that the user triggers, by one hand, reduction processing on the operation interface and conveniently and accurately performs a selection operation on content at an arbitrary position in the entire screen display area of the terminal device when the user holds the terminal device with a large screen with one hand and performs an operation on it.

The technical solution of any one of the method embodiments in FIG. 1A to FIG. 2 is described in detail below with several specific embodiments.

Figure 3A:
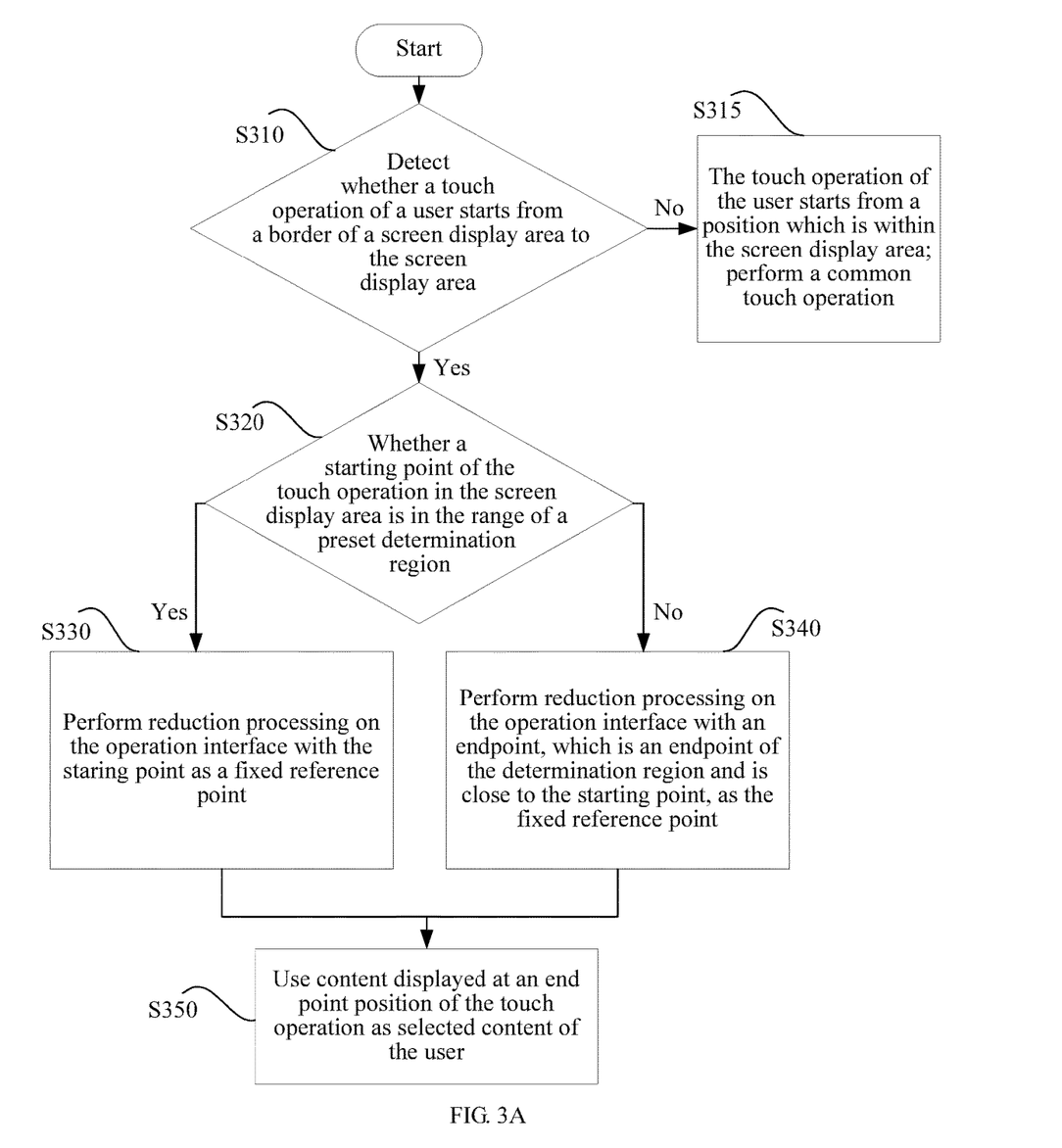
FIG. 3A is a flow chart of Embodiment 4 of a touch operation processing method provided by the present disclosure.

FIG. 3A is a flow chart of Embodiment 4 of a touch operation processing method provided by the present disclosure. As shown in FIG. 3A, in the touch operation processing method provided by this embodiment, performing reduction processing on an operation interface displayed in a screen display area may include: performing reduction processing on the operation interface with the starting point as a fixed reference point if a starting point is in the range of a preset determination region; if the starting point is not in the range of the preset determination region, performing reduction processing on the operation interface with an endpoint, which is an endpoint of the determination region and is close to the starting point, as the fixed reference point, where a part of the operation interface at a position of the fixed reference point remains unchanged during the reduction processing. The method in this embodiment may include the following steps.

Step S310: Detect whether a touch operation of a user starts from a border of a screen display area to the screen display area, if the touch operation of the user does not start from a border of the screen display area to the screen display area, but starts from a position which is within the screen display area, perform a common touch operation (step S315); if the touch operation of the user starts from a border of the screen display area to the screen display area, perform step S320.

Before step S310 of detecting whether the touch operation of the user starts from a border of the screen display area to the screen display area, an input instruction of the user may firstly be received. A border detecting function of the screen display area is started according to the input instruction, so as to avoid the situation that the processing method provided by the embodiment of the present disclosure is started by mistake when the user does not need to perform reduction processing on the operation interface. The input instruction of the user may be in the form of starting the border detecting function by presetting or in other forms, which is not limited in the embodiment of the present disclosure.

Step S320: Determine whether a starting point of the touch operation in the screen display area is in the range of a preset determination region, if the starting point is in the range of the preset determination region, perform reduction processing on the operation interface with the starting point as a fixed reference point (step S330); if the starting point is not in the range of the preset determination region, perform reduction processing on the operation interface with an endpoint, which is an endpoint of the determination region and is close to the starting point, as the fixed reference point (step S340), where a part of the operation interface at a position of the fixed reference point remains unchanged during the reduction processing.

Figure 3B:
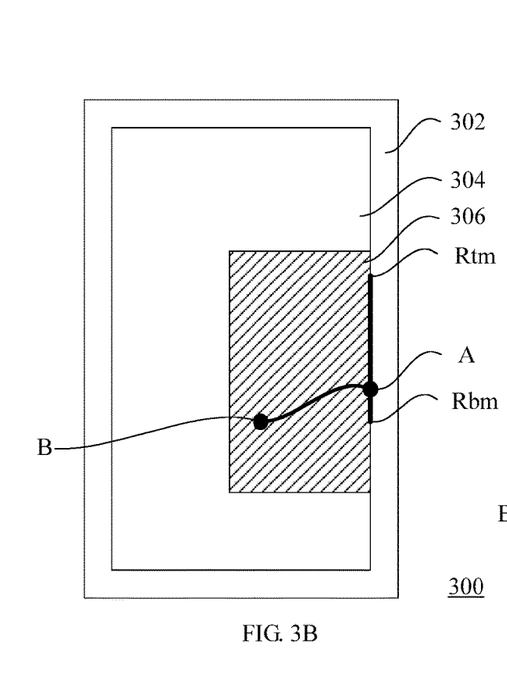
FIG. 3B is a first exemplary diagram of the touch operation processing method in FIG. 3A.

For step S330, FIG. 3B is a first exemplary diagram of the touch operation processing method in FIG. 3A. As shown in FIG. 3B, a terminal device 300 detects that the touch operation of the user starts from a border of the screen display area, for example, from a right border 302 of the screen display area, and the touch operation enters the screen display area 304 from a starting point A in the screen display area 304. It is determined whether the starting point A of the touch operation in the screen display area 304 when the touch operation enters the screen display area 304 is in a preset determination region Rbm-Rtm, the preset determination region Rbm-Rtm is a line which connected Rbm with Rtm, where Rbm is an lower endpoint of the determination region Rbm-Rtm, and Rtm is a upper endpoint of the determination region Rbm-Rtm. If the starting point A is in the preset determination region Rbm-Rtm, then, as shown in FIG. 3B, reduction processing is performed on the operation interface with the starting point A as the fixed reference point. During the reduction processing, a part of the operation interface at a position of the fixed reference point, that is, the starting point A, maintains unchanged. One edge of an operation interface 306 after the reduction processing includes the starting point A. That is, the operation interface 306 after the reduction processing closely contacts the right border 302 of the screen display area, from which the touch operation of the user starts, so that a finger of the same hand (for example, the right hand) of the user, which initiates the touch operation, conveniently operates on an arbitrary position in the operation interface after the reduction processing.

Figure 3C:
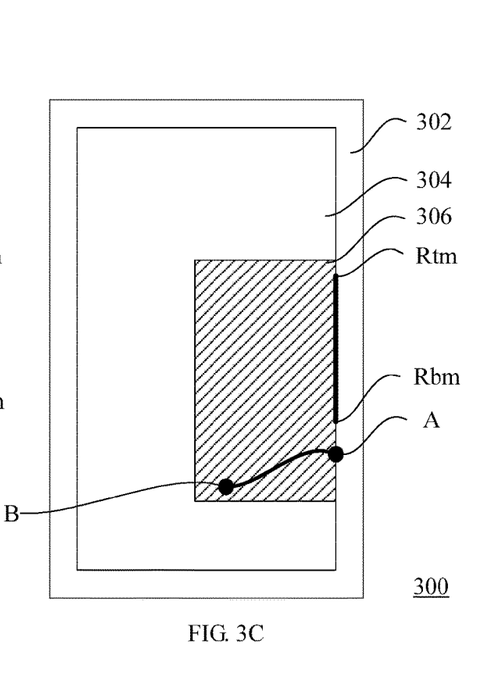
FIG. 3C is a second exemplary diagram of the touch operation processing method in FIG. 3A.

For the step S340, FIG. 3C is a second exemplary diagram of the touch operation processing method in FIG. 3A. As shown in FIG. 3C, a terminal device 300 detects that the touch operation of the user starts from a border of the screen display area, for example, from a right border 302 of the screen display area, and the touch operation enters the screen display area 304 from a starting point A in the screen display area 304. It is determined whether the starting point A of the touch operation in the screen display area 304 when the touch operation enters the screen display area 304 is in a preset determination region Rbm-Rtm, where Rbm is a lower endpoint of the determination region Rbm-Rtm, and Rtm is an upper endpoint of the determination region Rbm-Rtm. If the starting point A is not in the preset determination region Rbm-Rtm, then, as shown in FIG. 3C, reduction processing is performed on the operation interface with an endpoint, which is an endpoint of the determination region and is close to the starting point A, that is, the lower endpoint Rbm of the determination region, as a fixed reference point. During the reduction processing, a part of the operation interface at a position of the fixed reference point, that is, the lower endpoint Rbm, remains unchanged. One edge of an operation interface 306 after the reduction processing includes the starting point A. That is, the operation interface 306 after the reduction processing closely contacts the right border 302 of the screen display area, from which the touch operation of the user starts, so that a finger of the same hand (for example, the right hand) of the user, which initiates the touch operation, conveniently operates on an arbitrary position in the operation interface after the reduction processing.

Step S350: Use content displayed at an end point position of the touch operation as selected content of the user. Referring to FIG. 3A to FIG. 3C, after reduction processing is performed on the operation interface, an end point position B of the touch operation is detected, and the content displayed at the end point position B, for example, an icon of a certain application, a hyperlink address, a play/pause button, page up and page down buttons, or an exit button, is used as the selected content of the user. Types of selection operations, such as tapping and double tapping, can be performed on the selected content, and a type of a specific selection operation may be set in advance.

After the selection operation is completed, the operation interface 306 after the reduction processing may also be restored to the operation interface originally displayed in the screen display area 304. After the finger of the user leaves the screen display area 304, that is, after the selection operation on the selected content is completed, the operation interface 306 after the reduction processing can be automatically restored to the operation interface originally displayed in the screen display area 304. Of course, the operation interface 306 after the reduction processing may also be restored to the operation interface originally displayed in the screen display area 304 by using methods such as pressing a button (not shown) of the terminal device 300 or tapping the screen. The method of triggering the restoring of the operation interface is not limited in the embodiment of the present disclosure.

In the touch operation processing method provided by this embodiment, the touch operation of the user, which starts from the border to the screen display area, is detected, and according to the starting point position and the displacement of the touch operation in the screen display area, the operation interface is reduced to an operation interface of a corresponding size at a corresponding position. The content displayed at the end point position of the touch operation is used as the selected content of the user, and after the selection operation is completed, the size of the operation interface may be restored. The demand can be met that the user triggers, by one hand, reduction processing on the operation interface and conveniently and accurately performs a selection operation on content at an arbitrary position in the entire screen display area of the terminal device when the user holds the terminal device with a large screen with one hand and performs an operation on it.

Figure 4A:
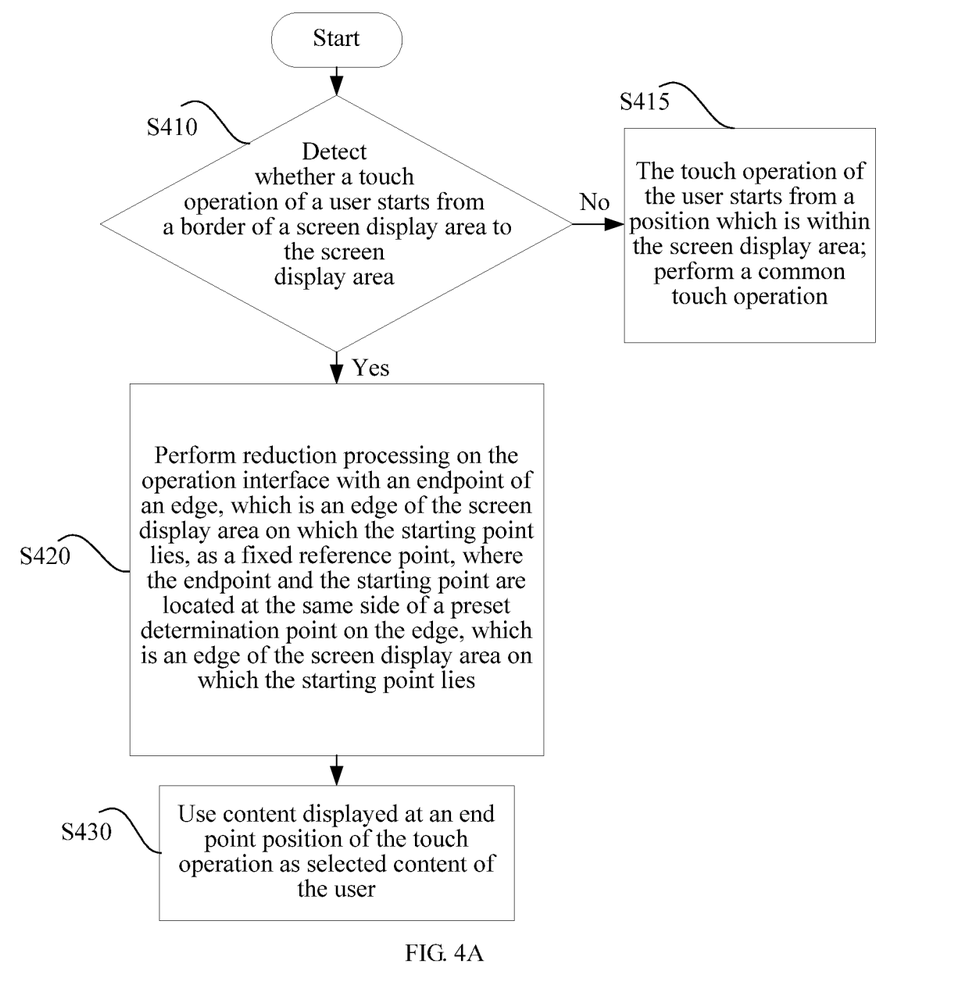
FIG. 4A is a flow chart of Embodiment 5 of a touch operation processing method provided by the present disclosure.

FIG. 4A is a flow chart of Embodiment 5 of a touch operation processing method provided by the present disclosure. As shown in FIG. 4A, in the touch operation processing method provided by this embodiment, performing reduction processing on an operation interface displayed in a screen display area may include: performing reduction processing on the operation interface with an endpoint of an edge, which is an edge of the screen display area on which a starting point lies, as a fixed reference point, where the endpoint and the starting point are located at the same side of a preset determination point on the edge, which is an edge of the screen display area on which the starting point lies, and a part of the operation interface at a position of the fixed reference point remains unchanged during the reduction processing. The method in this embodiment may specifically include the following steps.

Step S410: Detect whether a touch operation of a user starts from a border of a screen display area to the screen display area, if the touch operation of the user does not start from a border of the screen display area to the screen display area, but starts from a position which is within the screen display area, perform a common touch operation (step S415); if the touch operation of the user starts from a border of the screen display area to the screen display area, perform step S420.

Before the step S410 of detecting whether the touch operation of the user starts from a border of the screen display area to the screen display area, an input instruction of the user may firstly be received. A border detecting function of the screen display area is started according to the input instruction, so as to avoid the situation that the processing method provided by the embodiment of the present disclosure is started by mistake when the user does not need to perform reduction processing on the operation interface. The input instruction of the user may be in the form of starting the border detecting function by presetting or in other forms, which is not limited in the embodiment of the present disclosure.

Step S420: Perform reduction processing on the operation interface with an endpoint of an edge, which is an edge of the screen display area on which the starting point lies, as a fixed reference point, where the endpoint and the starting point are located at the same side of a preset determination point on the edge, which is an edge of the screen display area on which the starting point lies, and a part of the operation interface at a position of the fixed reference point maintains unchanged during the reduction processing.

Figure 4B:
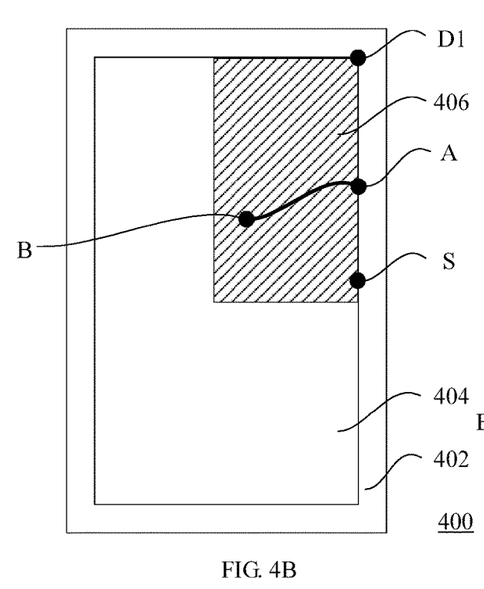
FIG. 4B is a first exemplary diagram of the touch operation processing method in FIG. 4A.

FIG. 4B is a first exemplary diagram of the touch operation processing method in FIG. 4A. As shown in FIG. 4B, a terminal device 400 detects that the touch operation of the user starts from a border of the screen display area, for example, from a right border 402 of the screen display area, and the touch operation enters the screen display area 404 from a starting point A in the screen display area 404. It is determined which side of a determination point S on a border, which is a border of the screen display area on which the starting point A lies, the starting point A in the screen display area 404 when the touch operation enters the screen display area 404 is located. If the starting point A is located above the preset determination point S, then, as shown in FIG. 4B, reduction processing is performed on the operation interface with an upper endpoint D1 of the border, which is a border of the screen display area on which the starting point A lies, as the fixed reference point. One edge of an operation interface 406 after the reduction processing includes the starting point A. That is, the operation interface 406 after the reduction processing closely contacts the right border 402 of the screen display area, from which the touch operation of the user starts, so that a finger of the same hand of the user, which initiates the touch operation, conveniently operates on an arbitrary position of the operation interface after the reduction processing.

Figure 4C:
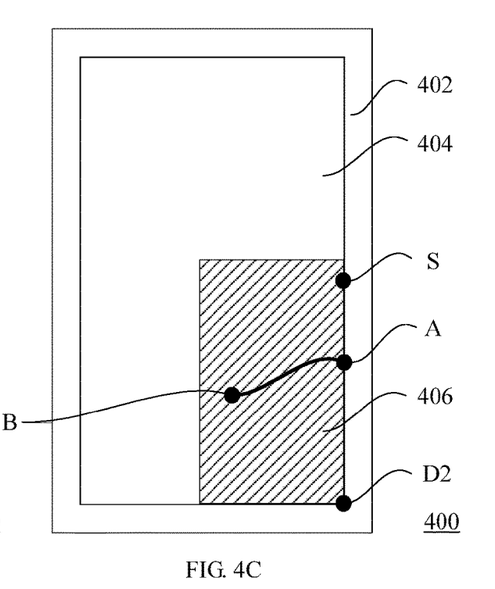
FIG. 4C is a second exemplary diagram of the touch operation processing method in FIG. 4A.

Step S430: Use content displayed at an end point position of the touch operation as selected content of the user. Referring to FIG. 4A to FIG. 4C, after reduction processing is performed on the operation interface, an end point position B of the touch operation is detected, and the content displayed at the end point position B, for example, an icon of a certain application, a hyperlink address, a play/pause button, page up and page down buttons, or an exit button, is used as the selected content of the user. Types of selection operations, such as tapping and double tapping, can be performed on the selected content, and a type of a specific selection operation may be set in advance.

After the selection operation is completed, the operation interface 406 after the reduction processing may also be restored to the operation interface originally displayed in the screen display area 404. After the finger of the user leaves the screen display area 404, that is, after the selection operation on the selected content is completed, the operation interface 406 after the reduction processing can be automatically restored to the operation interface originally displayed in the screen display area 404. Of course, the operation interface 406 after the reduction processing may also be restored to the operation interface originally displayed in the screen display area 404 by using methods such as pressing a button (not shown) of the terminal device 400 or tapping the screen. The method of triggering the restoring of the operation interface is not limited in the embodiment of the present disclosure.

In the touch operation processing method provided by this embodiment, the touch operation of the user, which starts from the border to the screen display area, is detected, and according to the starting point position and the displacement of the touch operation in the screen display area, the operation interface is reduced to an operation interface of a corresponding size at a corresponding position. The content displayed at the end point position of the touch operation may be used as the selected content of the user to perform a selection operation, and after the selection operation is completed, the size of the operation interface may be restored. The demand can be met that the user triggers, by one hand, reduction processing on the operation interface and conveniently and accurately performs a selection operation on content at an arbitrary position in the entire screen display area of the terminal device when the user holds the terminal device with a large screen with one hand and performs an operation on it.

Figure 5A:
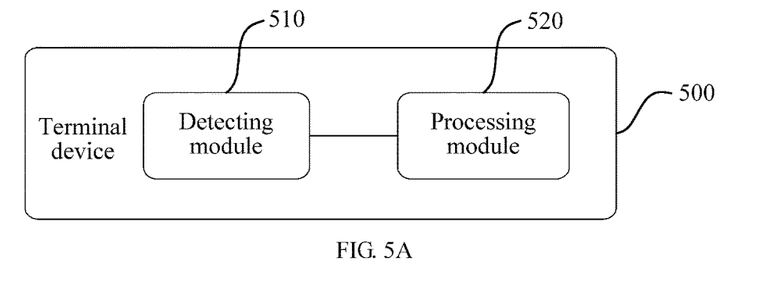
FIG. 5A is a schematic structural diagram of Embodiment 1 of a terminal device provided by the present disclosure.

FIG. 5A is a schematic structural diagram of Embodiment 1 of a terminal device provided by the present disclosure. As shown in FIG. 5A, a terminal device 500 in this embodiment may include a detecting module 510 and a processing module 520. The detecting module 510 is configured to detect a touch operation of a user, which starts from a border of a screen display area to the screen display area, and use the first point touched by the touch operation in the screen display area as a starting point. The processing module 520 is configured to perform, according to the touch operation, reduction processing on an operation interface displayed in the screen display area, where one edge of an operation interface after the reduction processing includes the starting point.

The terminal device in this embodiment may be configured to execute the technical solution of the method embodiment shown in FIG. 1A, and its implementation principle and technical effect are similar to those of the method embodiment shown in FIG. 1A, which are not described herein again.

Figure 5B:
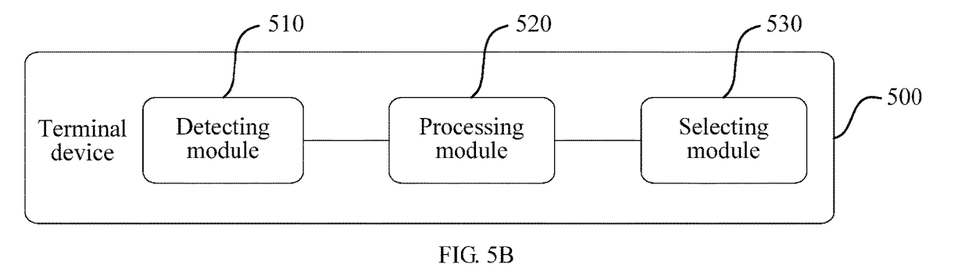
FIG. 5B is a schematic structural diagram of Embodiment 2 of a terminal device provided by the present disclosure.

FIG. 5B is a schematic structural diagram of Embodiment 2 of a terminal device provided by the present disclosure. As shown in FIG. 5B, a terminal device 500 in this embodiment may include a detecting module 510, a processing module 520, and a selecting module 530. The detecting module 510 is configured to detect a touch operation of a user, which starts from a border of a screen display area to the screen display area, and use the first point touched by the touch operation in the screen display area as a starting point. The processing module 520 is configured to perform, according to the touch operation, reduction processing on an operation interface displayed in the screen display area, where one edge of an operation interface after the reduction processing includes the starting point. The selecting module 530 is configured to use content displayed at an end point position of the touch operation as selected content of the user.

The terminal device in this embodiment may be configured to execute the technical solution of the method embodiment shown in FIG. 1B, and its implementation principle and technical effect are similar to those of the method embodiment shown in FIG. 1B, which are not described herein again.

Figure 6:
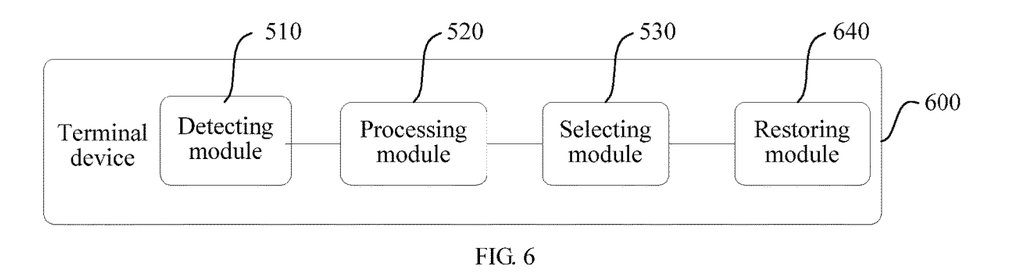
FIG. 6 is a schematic structural diagram of Embodiment 3 of a terminal device provided by the present disclosure.

FIG. 6 is a schematic structural diagram of Embodiment 3 of a terminal device provided by the present disclosure. As shown in FIG. 6, based on the apparatus structure shown in FIG. 5B, a terminal device 600 in this embodiment may further include a restoring module 640. The restoring module 640 is configured to restore an operation interface after the reduction processing to the operation interface originally displayed in the screen display area.

The terminal device in this embodiment may be configured to execute the technical solution of the method embodiment shown in FIG. 2, and its implementation principle and the technical effect are similar to those of the method embodiment shown in FIG. 2, which are not described herein again.

In the embodiment of the terminal device shown in any one of FIG. 5A to FIG. 6, the processing module 520 is further configured to perform, according to a track length of the touch operation, dynamic reduction processing on the operation interface displayed in the screen display area during the touch operation. Or, the processing module 520 is further configured to reduce the operation interface displayed in the screen display area to an operation interface of a fixed size according to the touch operation. Its implementation principle and the technical effect are similar to those in the method embodiment, which are not described herein again.

In the embodiment of the terminal device shown in any one of FIG. 5A to FIG. 6, the detecting module 510 is further configured to receive an input instruction of the user and start a border detecting function of the screen display area according to the input instruction. The processing module 520 is further configured to, if the starting point is in the range of a preset determination region, perform reduction processing on the operation interface with the starting point as a fixed reference point, and if the starting point is not in the range of the preset determination region, perform reduction processing on the operation interface with an endpoint, which is an endpoint of the determination region and is close to the starting point, as the fixed reference point, where a part of the operation interface at a position of the fixed reference point maintains unchanged during the reduction processing.

The terminal device in this embodiment may be configured to execute the technical solution of the method embodiment shown in any one of FIG. 3A to FIG. 3C, and its implementation principle and the technical effect are similar to those of the method embodiment shown in any one of FIG. 3A to FIG. 3C, which are not described herein again.

In the embodiment of the terminal device shown in any one of FIG. 5A to FIG. 6, the detecting module 510 is further configured to receive an input instruction of the user and start a border detecting function of the screen display area according to the input instruction. The processing module 520 is further configured to perform reduction processing on the operation interface with an endpoint of an edge, which is an edge of the screen display area on which the starting point lies, as a fixed reference point, where the endpoint and the starting point are located at the same side of a preset determination point on the edge, which is an edge of the screen display area on which the starting point lies, and a part of the operation interface at a position of the fixed reference point maintains unchanged during the reduction processing.

The terminal device in this embodiment may be configured to execute the technical solution of the method embodiment shown in any one of FIG. 4A to FIG. 4C, and its implementation principle and the technical effect are similar to those of the method embodiment shown in any one of FIG. 4A to FIG. 4C, which are not described herein again.

Figure 7:
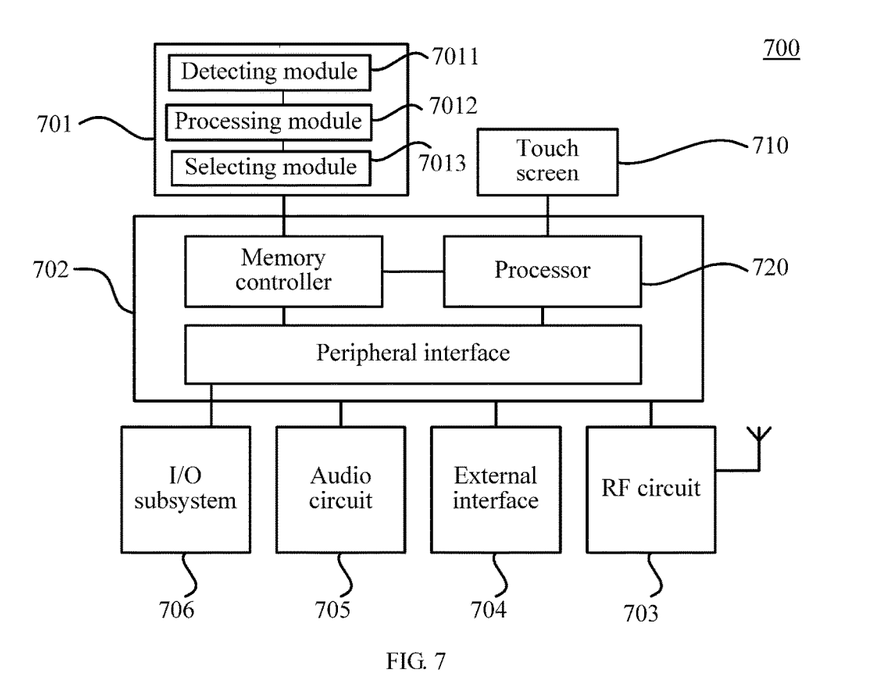
FIG. 7 is a schematic structural diagram of Embodiment 4 of a terminal device provided by the present disclosure.

FIG. 7 is a schematic structural diagram of Embodiment 4 of a terminal device provided by the present disclosure. As shown in FIG. 7, a terminal device 700 provided by this embodiment includes a memory 701, a chip 702, a radio frequency (RF) circuit 703, an external interface 704, an audio circuit 705, an input/output (I/O) subsystem 706, and a touch screen 710. The chip 702 includes a processor 720, a memory controller, a central processing unit (CPU), and a peripheral interface. The memory 701 includes a detecting module 7011, a processing module 7012, a selecting module 7013, and other functional modules, such as an operating system.

The components communicate through one or more communication buses or signal lines. The terminal device 700 may include, but is not limited to, a mobile phone or a tablet computer. Each of the components shown in FIG. 7 may be implemented through hardware, software or a combination of hardware and software, including one or more signal processing and/or application-specific integrated circuits. The memory 701 may include a high-speed random access memory, and a non-volatile solid-state storage device. The memory controller may control access of other components of the terminal device 700, such as the CPU and the peripheral interface, to the memory 701, so as to invoke each module in the memory 701 to perform a corresponding function.

The touch screen 710 is configured to detect a touch operation of a user, which starts from a border of a screen display area to the screen display area, and use the first point touched by the touch operation in the screen display area as a starting point. The processor 720 is configured to perform, according to the touch operation, reduction processing on an operation interface displayed in the screen display area, where one edge of an operation interface after the reduction processing includes the starting point.

The terminal device in this embodiment may be configured to execute the technical solution of the method embodiment shown in FIG. 1A, and its implementation principle and the technical effect are similar to those of the method embodiment shown in FIG. 1A, which are not described herein again.

Further, the touch screen 710 is further configured to use content displayed at an end point position of the touch operation as selected content of the user.

The terminal device in this embodiment may be configured to execute the technical solution of the method embodiment shown in FIG. 1B, and its implementation principle and the technical effect are similar to those of the method embodiment shown in FIG. 1B, which are not described herein again.

Further, the processor 720 is further configured to restore the operation interface after the reduction processing to the operation interface originally displayed in the screen display area.

The terminal device in this embodiment may be configured to execute the technical solution of the method embodiment shown in FIG. 2, and its implementation principle and the technical effect are similar to those of the method embodiment shown in FIG. 2, which are not described herein again.

In the embodiment of the terminal device shown in FIG. 7, the processor 720 is further configured to perform, according to a track length of the displacement along which the touch operation slides, dynamic reduction processing on the operation interface displayed in the screen display area during the touch operation. Or, the processor 720 is further configured to reduce the operation interface displayed in the screen display area to an operation interface of a fixed size according to the touch operation. Its implementation principle and the technical effect are similar to those in the method embodiment, which are not described herein again.

In the embodiment of the terminal device shown in FIG. 7, the touch screen 710 is further configured to receive an input instruction of the user and start a border detecting function of the screen display area according to the input instruction. The processor 720 is further configured to, if the starting point is in the range of a preset determination region, perform reduction processing on the operation interface with the starting point as a fixed reference point; if the starting point is not in the range of the preset determination region, perform reduction processing on the operation interface with an endpoint, which is an endpoint of the determination region and is close to the starting point, as the fixed reference point, where a part of the operation interface at a position of the fixed reference point maintains unchanged during the reduction processing.

The terminal device in this embodiment may be configured to execute the technical solution of the method embodiment shown in any one of FIG. 3A to FIG. 3C, and its implementation principle and the technical effect are similar to those of the method embodiment shown in any one of FIG. 3A to FIG. 3C, which are not described herein again.

In the embodiment of the terminal device shown in FIG. 7, the touch screen 710 is further configured to receive an input instruction of the user and start a border detecting function of the screen display area according to the input instruction. The processor 720 is further configured to perform reduction processing on the operation interface with an endpoint of an edge, which is an edge of the screen display area on which the starting point lies, as a fixed reference point, where the endpoint and the starting point are located at the same side of a preset determination point on the edge, which is an edge of the screen display area on which the starting point lies, and a part of the operation interface at a position of the fixed reference point maintains unchanged during the reduction processing.

The terminal device in this embodiment may be configured to execute the technical solution of the method embodiment shown in any one of FIG. 4A to FIG. 4C, and its implementation principle and the technical effect are similar to those of the method embodiment shown in any one of FIG. 4A to FIG. 4C, which are not described herein again.

Persons of ordinary skill in the art may understand that all or part of the steps of the methods in the embodiments may be implemented by a program instructing relevant hardware. The program may be stored in a computer readable storage medium. When the program is run, the foregoing steps of the method embodiments are performed. The storage medium may be any medium capable of storing program codes, such as read only memory (ROM), random access memory (RAM), magnetic disk, or optical disk.

Finally, it should be noted that the foregoing embodiments are merely intended for describing the technical solutions of the present disclosure other than limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the idea and scope of the technical solutions of the embodiments of the present disclosure.

The invention claimed is:

1. An electronic device, comprising: a touch-sensitive screen; a processor coupled to the touch-sensitive screen; and a memory coupled to the processor and configured to store instructions which, when executed by the processor, cause the electronic device to: display an operation interface on the touch-sensitive screen; detect a sliding gesture on the touch-sensitive screen, wherein the sliding gesture starts from a first area of the touch-sensitive screen and extends to a second area of the touch-sensitive screen, and wherein the first area shares a common border with the second area; dynamically scale the operation interface displayed on the touch-sensitive screen down to a scaled operation interface in response to a track length of the sliding gesture; detect an end point position of the sliding gesture in the second area; and perform a selection operation on content displayed at the end point position in response to detecting the end point position.

2. The electronic device of claim 1, wherein the instructions further cause the electronic device to:
   detect completion of the selection operation; and
   scale the scaled operation interface back to the operation interface in response to detecting completion of the selection operation.

3. The electronic device of claim 1, wherein the content is an application icon.

4. The electronic device of claim 1, wherein the content is a button.

5. The electronic device of claim 1, wherein the selection operation is tapping.

6. The electronic device of claim 1, wherein the selection operation is double tapping.

7. A gesture processing method implemented by an electronic device, comprising:
   displaying an operation interface on a touch-sensitive screen of the electronic device;
   detecting a sliding gesture on the touch-sensitive screen, wherein the sliding gesture starts from a first area of the touch-sensitive screen and extends to a second area of the touch-sensitive screen, and wherein the first area shares a common border with the second area;
   dynamically scaling the operation interface down to a scaled operation interface in response to a track length of the sliding gesture;
   detecting an end point position of the sliding gesture in the second area; and
   performing a selection operation on content displayed at the end point position in response to detecting the end point position.

8. The gesture processing method of claim 7, further comprising:
   detecting completion of the selection operation; and
   scaling the scaled operation interface back to the operation interface in response to detecting completion of the selection operation.

9. The gesture processing method of claim 7, wherein the content displayed at the end point position in the second area is an application icon.

10. The gesture processing method of claim 7, wherein the content displayed at the end point position in the second area is a button.

11. The gesture processing method of claim 7, wherein the selection operation is tapping or double tapping.

12. A computer program product comprising computer-executable instructions for storage on a non-transitory computer-readable medium that, when executed by a processor, cause an electronic device to: display an operation interface on a touch-sensitive screen of the electronic device; detect a sliding gesture on the touch-sensitive screen, wherein the sliding gesture starts from a first area of the touch-sensitive screen and extends to a second area of the touch-sensitive screen, and wherein the first area shares a common border with the second area; dynamically scale the operation interface down to a scaled operation interface in response to a track length of the sliding gesture; detect an end point position of the sliding gesture; and perform a selection operation on content displayed at the end point position in the second area in response to detecting the end point position of the sliding gesture.

13. The computer program product of claim 12, wherein the instructions further cause the electronic device to:
   detect completion of the selection operation; and
   scale the scaled operation interface back to the operation interface in response to detecting completion of the selection operation.

14. The computer program product of claim 12, wherein the content displayed at the end point position in the second area is one of an application icon, a hyperlink address, or a button.

15. The computer program product of claim 12, wherein the selection operation is tapping or double tapping.

* * * * *